United States Patent [19]  [11] 3,906,135
Krutzel  [45] Sept. 16, 1975

[54] WATER RESISTANT ADHESIVE
[75] Inventor: Lawrence Krutzel, Brooklyn, N.Y.
[73] Assignee: Air Products and Chemicals, Inc., Allentown, Pa.
[22] Filed: May 28, 1971
[21] Appl. No.: 148,242

[52] U.S. Cl.......... 428/246; 156/327; 260/29.6 WA; 260/29.6 BE; 428/507; 428/520; 428/522
[51] Int. Cl.² .................... C08L 23/08; C08L 29/04
[58] Field of Search ............ 260/29.6 WA, 29.6 BE; 156/327; 161/251, 254, 256, 88

[56] References Cited
UNITED STATES PATENTS

| | | | |
|---|---|---|---|
| 2,595,954 | 5/1952 | Kunze et al. | 260/29.6 |
| 2,963,461 | 12/1960 | Pockel | 260/31.8 |
| 3,003,979 | 10/1961 | Ptasienski et al. | 260/17 |
| 3,197,429 | 7/1965 | Baatz | 260/29.6 |
| 3,213,051 | 10/1965 | Pink | 260/29.6 |
| 3,296,174 | 1/1967 | Pickard | 260/29.6 |
| 3,563,851 | 2/1971 | Armour et al. | 161/251 |
| 3,629,171 | 12/1971 | Kremer et al. | 260/23.7 B |

OTHER PUBLICATIONS
Skeist, "Handbook of Adhesives" pp. 354–366, 368, 369, 373–376, Van Nostrand, Reinhold 1962 TP968 S5.

"Hockh's Chemical Dictionary", p. 448, 3d Ed. McGraw–Hill 1944.

Primary Examiner—Howard E. Schain
Assistant Examiner—E. A. Nielsen
Attorney, Agent, or Firm—Barry Moyerman; Richard A. Dannells

[57] ABSTRACT

An adhesive composition that, when cured, provides a bond having excellent water resistance, comprising an aqueous emulsion of (A) a mixture of (i) an addition polymer of about 50 to 100 weight percent vinyl acetate and a balance, if any, consisting essentially of one or more of dibutyl maleate, dibutyl fumarate ethylene, butyl acrylate, and 2-ethylhexylacrylate and (ii) polyvinyl alcohol, (B) a monocarboxylic acid which can esterify polyvinyl alcohol, e.g. benzoic acid, and (C) water.

11 Claims, No Drawings

WATER RESISTANT ADHESIVE

This invention relates to an aqueous adhesive composition that provides a bond having excellent water resistance, as well as to laminates prepared therefrom. More particularly, it relates to an aqueous emulsion adhesive formulated from polyvinyl alcohol, a monocarboxylic acid which can esterify polyvinyl alcohol, and an addition polymer of vinyl acetate.

Adhesive compositions comprised of an aqueous emulsion of a mixture of vinyl acetate addition polymer (e.g., ethylene/vinyl acetate copolymer) and polyvinyl alcohol are known. The bonds obtained upon drying of these compositions, while excellent in their dry state, have been known, however, to lose a large portion, for instance as much as about 80 percent or more, of their strength upon being wetted with water. A need exists, then, for a method of augmenting these adhesive compositions in some way which will enable them to yield bonds of increased water resistance without too great a sacrifice in their dry strengths. It is also desired that the viscosity stability of the adhesive emulsion not be sacrificed in order to obtain this water resistance.

It has now been found that the aforementioned vinyl acetate polymer/polyvinyl alcohol aqueous emulsion adhesive can yield cured bonds having substantially improved water resistance by including in the adhesive a monocarboxylic acid which can esterify polyvinyl alcohol.

Moreover, this increased water resistance can be attained without loss of emulsion stability and with an acceptably slight decrease in dry bond strength.

The adhesive composition of the present invention comprises an aqueous emulsion of (A) a mixture of (i) an addition polymer of about 50 to 100 weight percent of vinyl acetate and a balance, if any, consisting essentially of one or more of dibutyl maleate, ethylene, and 2-ethylhexylacrylate and (ii) polyvinyl alcohol, (B) a monocarboxylic acid which will esterify polyvinyl alcohol, in an amount of about 0.5 to 3.5, preferably about 2.3 to 2.6, moles per molar equivalent of polymerized vinyl alcohol in the emulsion, and (C) about 35 to 70 percent, based on the weight of the emulsion, of water.

Preparation of the vinyl acetate addition polymer can be by known methods, for example by aqueous emulsion polymerization using a free radical catalyst such as a peroxide, e.g. hydrogen peroxide, or a persulfate, and an emulsion solids concentration of about 50-55 weight percent. Suitable such polymers include vinyl acetate homopolymer, vinyl acetate/ethylenen copolymers containing up to about 50 weight percent ethylene, vinyl acetate/dibutylmaleate copolymer containing up to about 35 weight percent dibutylmaleate, and vinyl acetate/2-ethylhexylacrylate copolymer containing up to about 35 weight percent 2-ethylhexylacrylate. A preferred polyvinyl acetate (i.e. homopolymer) is one having a viscosity of about 500 to 4500 centipoises (cps.) (e.g. 800 to 900 cps.) at 25°C. as measured at 60 RPM with a Brookfield Viscometer using a No. 3 or 4 spindle. Preferred vinyl acetate/dibutylmaleate and vinyl acetate/2-ethylhexylacrylate copolymers are those containing about 70 weight percent vinyl acetate.

Most preferred, though, is an interpolymer of additively combined units of vinyl acetate and ethylene containing about 20 to 50 weight percent of polymerized ethylene and a balance consisting essentially of polymerized vinyl acetate, which interpolymer has a benzene-insolubles content of about 20 to 60, e.g. 30 to 50, weight percent and a benzene-soluble portion that has an intrinsic viscosity of about 1.0 to 2.5, e.g. 1.5 to 1.8.

The polyvinyl alcohol can likewise be prepared by known methods, for example by hydrolysis, also sometimes termed methanolysis, of polyvinyl acetate and preferably has a molecular weight of about 20,000 to 750,000. Also, the polyvinyl alcohol advantageously contains an average of about 0.75 to 1.0 hydroxyl group per polymerized monomer unit (e.g., as in a 75 to 100 percent hydrolyzed polyvinyl acetate) and is employed in an amount of about 2 to 8, preferably about 3 to 5, percent, based on the combined weight of the vinyl acetate polymer and the polyvinyl alcohol.

The monocarboxylic acid ingredient of the composition of the present invention can be aliphatic or aromatic, for example alkanoic of up to 10 carbon atoms or monocyclic aromatic of up to 10 carbon atoms. Specifically suitable are formic, acetic, propionic, benzoic, and ortho-toluic acids.

The monocarboxylic acid ingredient is preferably supplied to the emulsion in dissolved form in an inert solvent, such as ethanol, 2-ethoxyethanol, toluene, xylene, hexane, and mineral spirits. The most preferred acid/solvent combination is benzoic acid/2-ethoxyethanol.

There may also be included in the adhesive composition of the present invention, in order to aid the curing of the composition, a minor, effective amount of an acidic curing catalyst which is other than the aforementioned monocarboxylic acids. Examples of suitable such catalysts are those acidic compounds which catalyze carboxylic acid esterification reactions, e.g., phosphoric acid and toluene sulfonic acid. It is generally preferred that the amount employed of such a catalyst be sufficient to provide the emulsion with a pH of about 1.5 to 4.0.

There may also be added to the emulsion, if desired, a very minor amount of one or more wetting agents such as sodium dioctylsulfosuccinate to enhance the stability of the emulsion.

The curing of the adhesive composition of the present invention is best effected at about 225° to 375°F.

Uses for the composition include the preparation of laminates containing two or more superposed layers of solid material, e.g. wood, paper, resinous film or cloth, and are especially suitable for manufacturing water-resistant cloth-to-cloth or cloth-to-unsupported polyvinyl chloride film laminates. In the latter two applications, suggested cure times will vary with pH, choice of catalyst, solids content, etc., but it is generally advantageous to cure the adhesive at about 250°F. to 350°F. for about 0.5 to 5 minutes.

EXAMPLE I

Three adhesive compositions were prepared according to the formulations presented in the following Table I.

First there was prepared an aqueous emulsion of vinyl acetate/ethylene copolymer and polyvinyl alcohol. The solids portion of the emulsion contained about 4 weight percent of the polyvinyl alcohol and the water content of the emulsion was about 45 weight percent. The ethylene/vinyl acetate copolymer contained about 80 weight percent of polymerized vinyl acetate, and about 40 percent of the copolymer was insoluble in benzene. The benzene-soluble portion of the copolymer exhibited an intrinsic viscosity of about 1.5 to 1.8.

The polyvinyl alcohol had a molecular weight of about 25,000 and was the product of about 88 percent hydrolysis of polyvinyl acetate. The other ingredients listed in the Table were mixed with the polymer emulsion in the amounts indicated.

"Solox" is the trademark for a commercially available solvent reported as consisting of 100 parts by weight of denatured ethanol, 1 part ethyl acetate, 1 part aviation gasoline, and 2 parts denaturing grade methanol.

The results reported in Table I testify to the greater water resistance of those bonds (Runs 2 and 3) prepared with the monocarboxylic acid adjuvant, ortho-toluic acid. Moreover, this increase in wet strength was attained substantially without sacrifice in dry strength, especially when cure temperatures of 300°F. or higher were employed, or a pH below 4.0. Viscosities were not significantly increased by the presence of the monocarboxylic acid, thus indicating that its use is compatible with the need for relatively long periods of pot stability.

TABLE I

| RUN: | 1 | 2 | 3 |
|---|---|---|---|
| Ingredients (parts by weight) | | | |
| Polymer Emulsion | 100 | 100 | 100 |
| o-Toluic Acid in Solox (25% Solution) | | 8 | 8 |
| Solox | 8 | | |
| Aerosol O. T. (75% Aqueous Solution) | 0.3 | 0.3 | 0.3 |
| $H_3PO_4$ (75%) | | | 3 drops |
| pH | 5.55 | 5.02 | 3.3 |
| Viscosities (centipoises) | | | |
| Initially: | | | |
| At 12 RPM | 1200 | 1590 | 1660 |
| At 60 RPM | 680 | 880 | 926 |
| After 6 days: | | | |
| At 12 RPM | | | 1800 |
| At 60 RPM | | | 960 |
| Peel Strengths (lbs./linear in.) | | | |
| Cure and Test Conditions: | | | |
| No cure, dry | 2.8 ± .2 | 2.4 ± .2 | 3.5 ± .2 |
| No cure, wet | 0.7 ± .1 | 1.0 ± .2 | 0.9 ± .1 |
| 250°, dry | 3.2 ± .2 | 2.8 ± .2 | 2.5 ± .1 |
| 250°, wet | 1.4 ± .1 | 1.8 ± .1 | 1.9 ± .1 |
| 300°, dry | 2.7 ± .1 | 2.6 ± .2 | 2.5 ± .1 |
| 300°, wet | 1.5 ± .2 | 1.7 ± .1 | 3.0 ± .2 |
| 350°, dry | 2.3 ± .1 | 2.4 ± .1 | 2.5 ± .1 |
| 350°, wet | 1.2 ± .1 | 1.7 ± .1 | 2.0 ± .1 |

"Aerosol O. T." is a 75 weight percent aqueous solution of sodium dioctylsulfosuccinate.

Each adhesive composition was tested for effectiveness as a lamination adhesive in laminating cotton poplin cloth (Style No. 407, 1.60, Test Fabrics, New York, New York) to polyvinyl chloride film. The lamination procedure involved coating the polyvinyl chloride film with the adhesive, using a No. 40 wire-wound rod (R. D. Specialties, Webster, New York), immediately placing the cloth over the adhesive and rolling the resulting laminate once with a rubber roller. Each test lamination was prepared on the first day following the preparation of the adhesive composition. The laminations were then dried for 72 hours under ambient conditions.

Eight test laminates, divided into four pairs, were prepared from each adhesive. One pair was tested without being subjected to high temperature curing; another pair was cured at 250°F. for 5 minutes; a third pair was cured at 300°F. for 5 minutes; and the fourth pair was cured at 350°F. for 3 minutes. One laminate in each pair was tested for peel strength without further treatment, while the other laminate was first immersed for about one day in room temperature water and then tested for peel strength.

Peel strengths were measured on an Instron tester at a speed of 2 inches per minute. The results are reported in Table I. In all of the peeled samples the adhesive remained mostly on the polyvinyl chloride film, indicating that the type of failure was adhesive rather than cohesive.

Viscosities reported in Table I were determined at 25°C. with a Brookfield viscometer, using a No. 3 spindle.

EXAMPLE II 22 more adhesive compositions were prepared and tested in the manner of Example I, but according to the formulations given in Table II.

The same polymer emulsion was used as in Example I.

"Cellosolve" is the trademark for 2-ethoxyethanol.

The ingredient "o-Toluic Acid in Cellosolve" designates a 25 weight percent solution of ortho-toluic acid in Cellosolve. Similarly, the entry "Benzoic Acid in Cellosolve" indicates a 25 weight percent solution of benzoic acid in Cellosolve.

Para-toluene sulfonic acid, where used, was employed as a 25 weight percent aqueous solution. "Nopcowet" is a trademark designation for a commercially available wetting agent which is reportedly an aqueous solution of a sodium salt of an organic ester of sulfosuccinic acid.

Details of the different types of lamination referred to in Table II are as follows:

Type A — poplin cloth to poplin cloth.
Type B — poplin cloth to polyvinyl chloride with No. 40 wire-wound rod.
Type C — poplin cloth to polyvinyl chloride with No. 20 wire-wound rod.
Type D — poplin cloth to polyvinyl chloride with No. 30 wire-wound rod.

All cloth-to-cloth laminates were prepared in the following manner:

The cloth is coated with the adhesive, using a No. 10 wire-wound rod, and allowed to dry for one minute. Additional adhesive is then placed on the cloth with a No. 40 wire-wound rod. The cloth is then immediately folded over (adhesive side in) and rolled with a 7 pound roller.

The peel strengths of all cloth-to-cloth laminates were measured at a speed of 1 inch per minute, rather than 2.

In Runs 26 and 28 the heating time at 350°F. was only 30 seconds, and in Run 27 the 350°F. heating time was 1 minute.

The data of Runs 4–7 of Table II indicate again the greater water resistance of the bonds obtained when using ortho-toluic acid as an additive in the vinyl acetate/ethylene copolymer-based adhesive composition, especially at the higher concentrations of ortho-toluic acid. Runs 8–10 and 13–26 demonstrate the same effect for benzoic acid, while Runs 11, 12, 27, and 28 illustrate the water-proofing effect of including acetic acid in the composition.

TABLE II

| RUN: | 4 | 5 | 6 | 7 | 8 | 9 | 10 | 11 | 12 |
|---|---|---|---|---|---|---|---|---|---|
| Ingredients (parts by weight) | | | | | | | | | |
| Polymer Emulsion | 100 | 100 | 100 | 100 | 100 | 100 | 100 | 100 | 100 |
| o-Toluic Acid in Cellosolve (25% Solution) | — | 4 | 8 | 15 | — | — | — | — | — |
| Benzoic Acid in Cellosolve (25% Solution) | — | — | — | — | 4 | 8 | 15 | — | — |
| Acetic Acid (glacial) | — | — | — | — | — | — | — | 0.5 | 1.0 |
| $H_3PO_4$ (75%), to pH: | — | — | — | — | — | — | — | — | 3.2 |
| Aerosol O. T. | — | — | — | — | — | — | — | — | — |
| p-Toluene Sulfonic Acid, to pH: | — | — | — | — | — | — | — | — | — |
| Nopcowet | — | — | — | — | — | — | — | — | — |
| Viscosities (centipoises) | | | | | | | | | |
| Initially: | | | | | | | | | |
| At 12 RPM | — | — | — | — | — | — | — | — | — |
| At 60 RPM | — | — | — | — | — | — | — | — | — |
| After 24 hours: | | | | | | | | | |
| At 60 RPM | 1290 | 1060 | 880 | 760 | 1090 | 910 | 680 | 1320 | 1240 |
| After 1 week: | | | | | | | | | |
| At 60 RPM | 1300 | 1010 | 830 | 740 | 1080 | 920 | 670 | 1360 | 1210 |
| After 1 month: | | | | | | | | | |
| At 60 RPM | 1170 | 880 | 2200 | 1360 | 1210 | 1850 | 600 | 1590 | 1530 |
| After 5 months: | | | | | | | | | |
| At 12 RPM | — | — | — | — | — | — | — | — | — |
| At 60 RPM | — | — | — | — | — | — | — | — | — |
| Type of Lamination | A | A | A | A | A | A | A | A | A |
| Peel Strengths (lbs./linear in.) | | | | | | | | | |
| Cure and Test Conditions: | | | | | | | | | |
| No cure, dry | 18.0 | 8.0 | 11.0 | 11.0 | 17.0 | 14.0 | 9.4 | 19.0 | 13.0 |
| No cure, wet | 4.4 | 3.5 | 4.0 | 5.6 | 4.0 | 5.4 | 5.8 | 3.9 | 4.9 |
| 250°, dry | 8.2 | 15.6 | 14.0 | 15.0 | 11.0 | 12.0 | 14.6 | 14.6 | 9.0 |
| 250°, wet | 6.0 | 6.0 | 6.0 | 7.2 | 8.0 | 8.0 | 8.0 | 6.4 | 6.0 |
| 300°, dry | 8.4 | 16.0 | 8.0 | 14.0 | 13.0 | 14.0 | 17.0 | 12.0 | 18.0 |
| 300°, wet | 6.2 | 7.6 | 6.4 | 8.0 | 6.8 | 9.0 | 7.0 | 7.4 | 6.4 |
| 350°, dry | 13.4 | 17.0 | 9.6 | 11.6 | 12.0 | 14.0 | 14.0 | 12.0 | 16.0 |
| 350°, wet | 8.2 | 8.0 | 8.0 | 12.0 | 9.4 | 10.4 | 11.6 | 8.6 | 10.4 |

| RUN: | 13 | 14 | 15 | 16 | 17 | 18 | 19 | 20 | 21 |
|---|---|---|---|---|---|---|---|---|---|
| Ingredients (parts by weight) | | | | | | | | | |
| Polymer Emulsion | 100 | 100 | 100 | 100 | 100 | 100 | 100 | 100 | 100 |
| o-Toluic Acid in Cellosolve | — | — | — | — | — | — | — | — | — |
| Benzoic Acid in Cellosolve | — | 4 | 8 | 16 | 16 | — | 4 | 8 | 16 |
| Acetic Acid (glacial) | — | — | — | — | — | — | — | — | — |
| $H_3PO_4$ (75%), to pH: | — | 3 | 3 | 3 | 2 | 2.1 | 2.0 | 1.9 | 1.9 |
| Aerosol O. T. (75% Aqueous Solution) | 0.3 | 0.3 | 0.3 | 0.3 | 0.3 | 0.3 | 0.3 | 0.3 | 0.3 |
| p-Toluene Sulfonic Acid, to pH: | — | — | — | — | — | — | — | — | — |
| Nopcowet | — | — | — | — | — | — | — | — | — |
| Viscosities (centipoises) | | | | | | | | | |
| Initially: | | | | | | | | | |
| At 12 RPM | 2400 | 200 | 1500 | 1100 | 1100 | — | — | — | — |
| At 60 RPM | 1340 | 1110 | 840 | 790 | 700 | 1270 | 1120 | 1000 | 780 |
| After 24 hours: | | | | | | | | | |
| At 60 RPM | — | — | — | — | — | — | — | — | — |
| After 1 week: | | | | | | | | | |
| At 60 RPM | — | — | — | — | — | 1800 | 1200 | 980 | 750 |
| After 1 month: | | | | | | | | | |
| At 60 RPM | — | — | — | — | — | — | — | — | — |
| After 5 months: | | | | | | | | | |
| At 12 RPM | 2800 | — | 2050 | 1950 | 1600 | — | — | — | — |
| At 60 RPM | 1550 | — | 1280 | 1300 | 1200 | — | — | — | — |
| Type of Lamination | B | B | B | B | B | C | C | C | C |
| Peel Strengths (lbs./linear in.) | | | | | | | | | |
| Cure and Test Conditions: | | | | | | | | | |
| No cure, dry | 3.3 | 3.4 | 3.6 | 3.3 | 3.4 | 3.5 | 3.2 | 2.9 | 2.8 |
| No cure, wet | — | — | 1.2 | 1.4 | 1.7 | 0.7 | 0.9 | 0.8 | 1.0 |
| 250°, dry | 3.8 | 3.5 | 3.2 | 3.0 | 3.2 | 2.4 | 2.5 | 2.5 | 2.5 |
| 250°, wet | 1.5 | 1.5 | 1.5 | 1.75 | 1.85 | 0.7 | 1.0 | 1.8 | 1.0 |
| 300°, dry | 3.5 | — | 3.3 | 3.1 | 3.1 | 2.5 | 2.5 | 2.3 | 2.5 |
| 300°, wet | 1.8 | 1.8 | 2.0 | 1.9 | 2.1 | 0.9 | 1.4 | 1.3 | 1.4 |
| 350°, dry | 3.1 | 3.1 | 3.1 | 3.0 | 3.0 | 2.4 | 2.3 | 2.4 | 2.6 |
| 350°, wet | 1.5 | 2.1 | 2.3 | 2.3 | 2.7 | 1.3 | 1.3 | 1.2 | 2.1 |

TABLE II—Continued

| RUN: | 22 | 23 | 24 | 25 | 26 | 27 | 28 |
|---|---|---|---|---|---|---|---|
| Ingredients (parts by weight) | | | | | | | |
| Polymer Emulsion | 100 | 100 | 100 | 100 | 100 | 100 | 100 |
| o-Toluic Acid in Cellosolve | — | — | — | — | — | — | — |
| Benzoic Acid in Cellosolve | — | 16 | — | 16 | 16 | — | — |
| Acetic Acid (glacial) | — | — | — | — | — | 1 | — |
| $H_3PO_4$ (75%), to pH: | — | — | — | — | 2 | 2 | — |
| Aerosol O. T. | 0.3 | 0.3 | — | — | — | — | — |
| p-Toluene Sulfonic Acid, to pH: | — | 2 | — | 2 | — | — | — |
| Nopcowet 50 | — | — | — | — | 0.3 | 0.3 | — |
| Viscosities (centipoises) | | | | | | | |
| Initially: | | | | | | | |
| At 12 RPM | 2400 | 1250 | 2400 | 900 | — | — | — |
| At 60 RPM | 1330 | 780 | 1300 | 620 | — | — | — |
| After 24 hours: | | | | | | | |
| At 60 RPM | — | — | — | — | — | — | — |
| After 1 week: | | | | | | | |
| At 60 RPM | — | — | — | — | — | — | — |
| After 1 month: | | | | | | | |
| At 60 RPM | — | — | — | — | — | — | — |
| After 5 months: | | | | | | | |
| At 12 RPM | — | — | — | — | — | — | — |
| At 60 RPM | — | — | — | — | — | — | — |
| Type of Lamination | D | D | A | A | ← PVC-to-cloth → | | |
| Peel Strengths (lbs./linear in.) | | | | | | | |
| Cure and Test Conditions: | | | | | | | |
| No cure, dry | 3.7 | 2.5 | — | — | — | — | — |
| No cure, wet | 1.1 | 1.0 | — | — | — | — | — |
| 250°, dry | 3.1 | 1.9 | — | — | — | — | — |
| 250°, wet | 1.2 | 1.5 | — | — | — | — | — |
| 300°, dry | 2.9 | 1.9 | 15 | 14.5 | — | — | — |
| 300°, wet | 1.3 | 1.5 | 9.0 | 10.5 | — | — | — |
| 350°, dry | 2.7 | 2.0 | 16.8 | 16.0 | 3±.1 | — | 3.6±.4 |
| 350°, wet | 1.4 | 1.8 | 10 | 10.3 | 2±.1 | 1.8±.1 | 1.4±.1 |

I claim:

1. An adhesive composition consisting essentially of
   A. an aqueous vinyl acetate-ethylene copolymer emulsion containing polyvinyl alcohol, wherein the copolymer is an interpolymer of additively combined units of vinyl acetate and ethylene containing about 20 to 50 weight percent of polymerized ethylene and a balance consisting essentially of polymerized vinyl acetate,
   B. from about 0.5 to 3.5 moles of a monocarboxylic acid per molar equivalent of polymerized vinyl alcohol in the emulsion, the monocarboxylic acid being selected from the group consisting essentially of alkanoic acids and monocyclic aromatic acids each having up to 10 carbon atoms,
   C. from about 35 to 70 percent, based on the weight of the emulsion of water, and
   D. an acidic curing catalyst other than the monocarboxylic acid of (B) in an amount sufficient to provide the composition with a pH of about 1.5 to 4.0.

2. The composition of claim 1 wherein the monocarboxylic acid is selected from the group consisting of benzoic, ortho-toluic, formic, acetic, and propionic acids.

3. The composition of claim 1 wherein the interpolymer has a benzene-insolubles content of about 20 to 60 weight percent.

4. The composition of claim 1 wherein the polyvinyl alcohol is present in an amount of about 2 to 8 percent, based on the combined weight of the interpolymer and the polyvinyl alcohol.

5. The composition of claim 4 wherein the polyvinyl alcohol contains an average of about 0.75 to 1.0 hydroxyl group per polymerized monomer unit.

6. The composition of claim 5 wherein the polyvinyl alcohol has a molecular weight of about 20,000 to 750,000.

7. The composition of claim 2 wherein the monocarboxylic acid is benzoic acid.

8. The composition of claim 1 wherein the curing catalyst is phosphoric acid or para-toluene sulfonic acid.

9. A laminate comprising at least two superposed layers of solid material bonded together by the cured adhesive composition of claim 1.

10. The laminate of claim 9 wherein at least one layer is cloth.

11. The laminate of claim 9 wherein at least one layer is unsupported polyvinyl chloride film.

* * * * *